United States Patent
Kang

(10) Patent No.: US 9,307,339 B2
(45) Date of Patent: Apr. 5, 2016

(54) DISPLAY APPARATUS AND METHOD FOR PROVIDING STEREOPHONIC SOUND SERVICE

(71) Applicant: SAMSUNG ELECTRONICS CO., LTD., Suwon-si (KR)

(72) Inventor: Ho-woong Kang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 129 days.

(21) Appl. No.: 14/185,345

(22) Filed: Feb. 20, 2014

(65) Prior Publication Data

US 2015/0003648 A1    Jan. 1, 2015

(30) Foreign Application Priority Data

Jun. 27, 2013   (KR) .................. 10-2013-0074889

(51) Int. Cl.
| | |
|---|---|
| *H04S 7/00* | (2006.01) |
| *H04N 5/60* | (2006.01) |
| *H04N 21/439* | (2011.01) |
| *H04N 21/422* | (2011.01) |
| *H04N 21/434* | (2011.01) |
| *H04N 21/44* | (2011.01) |
| *H04N 21/442* | (2011.01) |

(52) U.S. Cl.
CPC .. *H04S 7/30* (2013.01); *H04N 5/60* (2013.01); *H04N 21/42201* (2013.01); *H04N 21/439* (2013.01); *H04N 21/4341* (2013.01); *H04N 21/4394* (2013.01); *H04N 21/44008* (2013.01); *H04N 21/44218* (2013.01)

(58) Field of Classification Search
CPC ........ H04R 5/02; H04R 2499/15; H04R 5/04; H04R 1/02; H04R 3/12; H04R 2499/11; H04R 2420/07; H04R 27/00

USPC ......................................................... 381/306
See application file for complete search history.

(56) References Cited

U.S. PATENT DOCUMENTS

| | | | | |
|---|---|---|---|---|
| 2003/0048353 | A1* | 3/2003 | Kenoyer ................ | H04N 7/147 348/14.12 |
| 2010/0118199 | A1* | 5/2010 | Kobayashi ............. | H04N 5/607 348/578 |
| 2011/0193838 | A1* | 8/2011 | Hsu ......................... | G09G 5/00 345/207 |

FOREIGN PATENT DOCUMENTS

KR   10-2010-0028326 A   3/2010

OTHER PUBLICATIONS

Communication dated Nov. 11, 2014, issued by the European Patent Office in counterpart European Application No. 14158303.9.

* cited by examiner

*Primary Examiner* — Mark Blouin
(74) *Attorney, Agent, or Firm* — Sughrue Mion, PLLC

(57) ABSTRACT

Embodiments disclose a display apparatus including a controller configured to detect a vocalized position in the video frame; and an audio processor configured to process an audio signal corresponding to the video frame differently according to a distance between the vocalized position and each of the plurality of speakers, create a plurality of audio output signals, and provide each created audio output signal to each of the plurality of speakers, and the controller controls the audio processor to change the each created audio output signal provided to the each of the plurality of speakers according to the moved vocalized position in response to the vocalized position being moved within the video frame.

21 Claims, 9 Drawing Sheets

(a)

(b)

(c)

DISPLAY APPARATUS AND METHOD FOR PROVIDING STEREOPHONIC SOUND SERVICE

CROSS-REFERENCE TO RELATED APPLICATIONS

This application claims priority from Korean Patent Application No. 10-2013-0074889, filed in the Korean Intellectual Property Office on Jun. 27, 2013, the disclosure of which is incorporated by reference in its entirety.

BACKGROUND

1. Field

Methods and apparatuses consistent with the exemplary embodiments relate to a display apparatus and a method thereof. In particular, exemplary embodiments relate to a display apparatus for providing a stereophonic sound service and a method thereof.

2. Description of the Related Art

With the recent development of digital broadcasting technologies, a display apparatus provides high quality services in addition to high quality image services. Further, as display apparatuses become more capable of providing 3D image services, stereophonic sound service technologies of various methods are being developed that emphasize 3D stereo effects of images.

However, related art stereophonic sound services provide nothing more than the effect of providing audio corresponding to video images being displayed through a plurality of channels.

In other words, the related art stereophonic sound services have the mere effect of outputting stereo sound by a plurality of speakers through multi channels to provide more audio sound corresponding to displayed high definition images. However, the related art stereophonic sound services are not capable of providing the stereophonic effect. In other words, the related art stereophonic sound services are not capable of providing audio which simulates an effect of audio being output from each image.

SUMMARY

Exemplary embodiments may provide a stereophonic sound effect which simulates an effect of audio being output from an image being displayed.

According to an aspect of an exemplary embodiment, there is provided a controller configured to detect a vocalized position in a video frame in a display; and an audio processor configured to process an audio signal corresponding to the video frame differently according to a distance between the vocalized position and each of a plurality of speakers, create a plurality of audio output signals, and provide each created audio output signal to each of the plurality of speakers, and the controller controls the audio processor to change the each created audio output signal provided to the each of the plurality of speakers according to a moved vocalized position in response to the vocalized position being moved within the video frame.

The audio processor may divide the audio signal corresponding to the video frame into a plurality of sub audio signals, adjust and re-combine the plurality of sub audio signals according to the distance between the vocalized position and each of the plurality of speakers, and create the plurality of audio output signals.

In addition, the controller may analyze the video frame to determine a vocalizer of the audio signal, and control the audio processor to divide the audio signal into a plurality of sub audio signals based on an audio characteristic corresponding to the vocalize.

In addition, the controller may compare a plurality of video frames being sequentially input to detect a moved area, and determine that the detected moved area is the moved vocalized position.

Furthermore, the display apparatus may further comprise a contents receiver configured to receive contents consisting of the video frame and the audio signal, and the controller may detect the vocalized position per each video frame based on additional data recorded in a header portion of the contents.

Furthermore, the display apparatus may further comprise a sensor configured to sense a distance from a viewer, and the controller may detect the vocalized position and control the audio processor to create a different audio output signal according to the vocalized position if the distance from the viewer is within a predetermined distance, and create a same audio output signal if the distance from the viewer exceeds the predetermined distance.

Furthermore, the plurality of speakers may be disposed in each edge or in a central portion of each side of the main body of the display apparatus.

In addition, the plurality of speakers may be vibration speakers disposed in a rear surface of the display.

Further, the display may be configured to display the video frame.

In addition, the plurality of speakers may be disposed in a main body of the display apparatus.

According to another aspect of an exemplary embodiment, there is provided a method for providing a stereophonic sound service of a display apparatus, the method including detecting a vocalized position within a video frame to be displayed; processing an audio signal corresponding to the video frame differently according to a distance between the vocalized position and each of the plurality of speakers, and creating a plurality of audio output signals; outputting the plurality of audio output signals using a plurality of speakers disposed in a main body of the display apparatus; and changing each of the audio output signals provided to the each of the plurality of speakers according to a moved vocalized position in response to the vocalized position being moved within the video frame.

In addition, the creating the plurality of audio output signals may involve dividing the audio signal corresponding to the video frame into a plurality of sub audio signals, adjusting and re-combining the plurality of sub audio signals according to the distance between vocalized position and each of the plurality of speakers, and creating the plurality of audio output signals.

In addition, the creating the plurality of audio output signals may involve analyzing the video frame to determine a vocalizer of the audio signal, and dividing the audio signal into a plurality of sub audio signals based on an audio characteristic corresponding to the vocalize.

Furthermore, the changing each of the output signals may involve comparing a plurality of video frames being sequentially input to detect a moved area, and determining that the detected moved area is the moved vocalized position.

In addition, the method may further comprise receiving contents consisting of the video frame and the audio signal, and the detecting may involve detecting the vocalized position per each video frame based on additional data recorded in a header portion of the contents.

In addition, the method may further comprise sensing a distance from a viewer, and the creating the plurality of audio output signals may involve detecting the vocalized position and controlling the audio processor to create a different audio output signal according to the vocalized position if the distance from the viewer is within a predetermined distance, and creating a same audio output signal if the distance from the viewer exceeds the predetermined distance.

In addition, the plurality of speakers may be disposed in each edge or in a central portion of each side of the main body of the display apparatus.

Furthermore, the plurality of speakers may be vibration speakers disposed in a rear surface of a displayer.

According to yet another aspect of an exemplary embodiment, there is provided a method for providing a stereophonic sound service of a display apparatus, the method including receiving contents comprising at least one video frame and at least one audio signal; detecting a vocalized position within the at least one video frame of the contents; measuring a plurality of distances between the vocalized position and a plurality of speakers; creating a plurality of audio output signals based on the corresponding plurality of distances between the vocalized position and the plurality of speakers; and outputting the plurality of audio output signals through the corresponding speakers.

According to the aforementioned various exemplary embodiments of the present disclosure, a display apparatus may provide the stereophonic sound effect as if audio is actually being output from the image being displayed.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Figure 1:
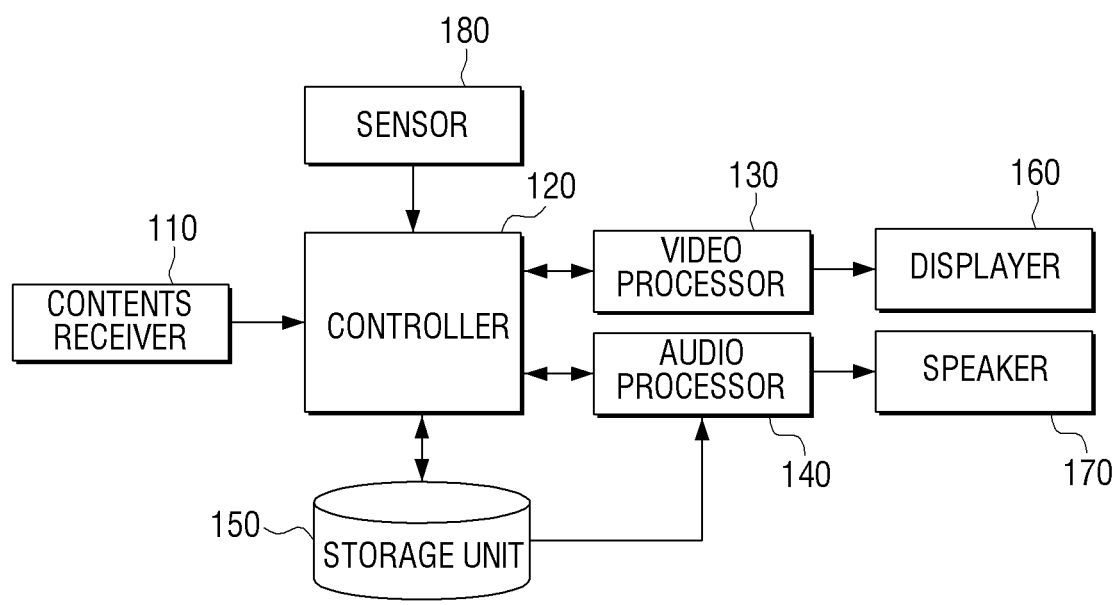
FIG. 1 is a block diagram of a display apparatus according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

As illustrated in FIG. 1, a display apparatus may be a terminal apparatus such as a smart TV, smart phone, or a tablet PC, which includes a contents receiver 110, controller 120, video processor 130, audio processor 140, storage unit 150, displayer 160 and speaker 170.

The contents receiver 110 receives contents consisting of a video frame and audio signals from a contents server (not illustrated). The contents receiver 110 may be embodied in a format of comprising configurative elements such as a tuner (not illustrated), demodulator (not illustrated), equalizer (not illustrated), and decoder (not illustrated), and may receive contents from the contents server (not illustrated). The detailed explanation and operation of the configurative elements included in such a contents receiver 110 is omitted.

Meanwhile, the display apparatus 110 according to the present disclosure may not only receive contents from the contents server (not illustrated) through the contents receiver 110, but may receive contents from the contents server (not illustrated) according to various communication methods.

The controller 120 controls the overall operations of each configurative element of the display apparatus. According to a control command of such a controller 120, the video processor 130 detects and processes video data included in the contents received through the contents receiver 110. In particular, the video processor 130 performs decoding of the video data included in the contents, and then performs scaling of the video frame regarding the decoded video data in accordance with the screen size of the displayer 160. Therefore, the displayer 160 may display an image corresponding to the video frame signal-processed through the video processor 130.

The controller 120 detects a vocalized position within the video frame signal-processed per each video data through the video processor 130. In particular, the controller 120 detects at least one screen image within the signal-processed video frame. When the screen image is detected, the controller 120 may obtain image information on the screen image detected within the corresponding video frame with reference to the image information on the plurality of screen images stored in the storage unit 150. In particular, the storage unit 150 stores image information including a screen image of a vocalizing object and vocalized position information of the corresponding object.

Therefore, the controller 120 may obtain image information related to the screen image detected within the video frame among the image information prestored in the storage unit 150, and detect the vocalized position of the screen image detected based on the vocalized position information included in the obtained image information.

According to an additional aspect of the present disclosure, the controller 120 may detect the vocalized position of each video frame based on the additional data recorded in a header portion of the received contents. In particular, in the header portion of the contents, additional data including the vocalized position information on the screen image of each video frame may be recorded. In this case, the controller 120 may detect the vocalized position on the screen image of each video frame based on the vocalized position information per each video frame included in the additional data recorded in the header portion of the contents.

The audio processor 140 signal-processes an audio signal included in the received contents into an audio output signal having a format which may be output from the speaker 170. The speaker 170 may be a plurality of speakers so as to be dispersedly disposed in a main body of the display apparatus. In particular, exemplary embodiments may disclose the plurality of speakers being disposed in each edge or center of each side of the main body of the display apparatus. Therefore, the audio processor 140 signal-processes each of the audio signal included in the contents into an audio output signal corresponding to the plurality of speakers 170 dispersedly disposed in the main body of the display apparatus.

The audio processor 140 processes the audio signal corresponding to the video frame differently according to the distance from the plurality of speakers 170, and creates an audio output signal corresponding to each of the plurality of speakers 170. Next, the audio processor 140 may provide each of the plurality of speakers 170 with the audio output signal corresponding thereto. Accordingly, the plurality of speakers 170 may output audio of different audio volumes based on the audio output signal provided through the audio processor 140. Therefore, a user may be provided with the stereophonic sound service having an effect as if audio is output at a point where an image displayed on a screen of the display apparatus is located.

Each image information stored in the aforementioned storage unit 150 may further include frequency band information per each object. Therefore, the audio processor 140 may obtain image information including frequency band information related to the frequency band of the corresponding audio signal among the plurality of image information stored in the storage unit 150. When such image information is obtained, the controller 120 determines whether or not the image information corresponds to the pre-obtained image information. As such, the controller 120 determines whether or not the image information obtained based on the screen image detected within the video frame corresponds to the screen image included in the image information obtained based on the frequency band of the audio signal corresponding to the video frame through the audio processor 140.

If the two screen images correspond to each other, the audio processor 140 may process the audio signal corresponding to the video frame differently according to the distance between the predetected vocalized position and the plurality of speakers 170, and may create an audio output signal corresponding to each of the plurality of speakers 170 and output the created audio output signal through the plurality of speakers 170.

The controller 120 according to the present disclosure may determine whether or not the screen images included in the two image information correspond to each other, so that the audio matching the screen image displayed through the displayer 160 can be output properly at the point where the corresponding screen image is displayed.

Meanwhile, according to another aspect of the present disclosure, the display apparatus may further comprise a sensor 180 for sensing a distance from a viewer. When the distance between the display apparatus and the viewer is sensed through the sensor 180, the controller 120 determines whether or not the sensed distance is within a predetermined distance. If it is determined that the distance between the display apparatus and the viewer is within the predetermined distance, the controller 120 controls the audio processor 140 to create a different audio output signal according to the distance between the predetected vocalized position and the plurality of speakers 170. Therefore, the plurality of speakers 170 may output audio of different audio volumes based on the audio output signal created through the audio processor 140.

Meanwhile, if it is determined that the distance between the display apparatus and the viewer exceeds the predetermined distance, the controller 120 controls the audio processor 140 to create a same audio output signal. Therefore, the plurality of speakers 170 may output audio having the same size based on the audio output signal created through the audio processor 140.

The display apparatus according to the present disclosure may provide a stereophonic sound service of an effect as if audio is output at the point where the image displayed on the screen of the display apparatus is located, or may provide a general sound service according to the extent of distance between the display apparatus and the viewer.

Below is a detailed explanation of an operation of outputting audio of different audio volumes in the plurality of speakers 170 according to the display location of the screen image detected within the video frame with reference to FIG. 2.

Figure 2:
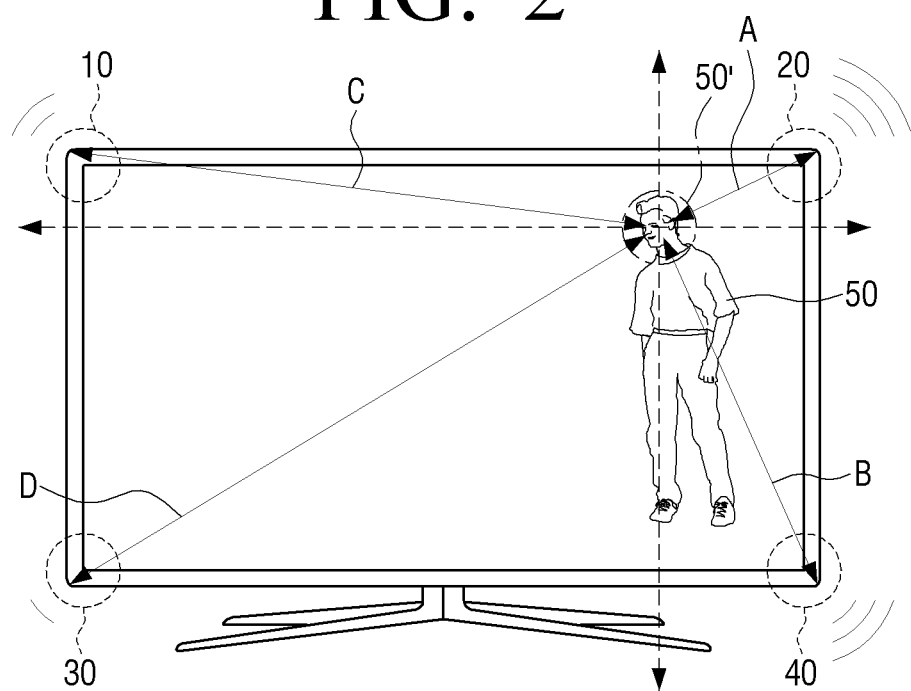
FIG. 2 is an exemplary view of a stereophonic sound service being provided in a display apparatus according to an exemplary embodiment.

FIG. 2 is an exemplary view of providing a stereophonic sound service in the display apparatus according to an exemplary embodiment.

As illustrated in FIG. 2, the controller 120 may detect a human screen image 50 within the video frame displayed on the screen through the displayer 160. When such a human screen image 50 is detected, the controller 120 obtains image information related to the predetected human screen image 50 among the prestored image information. Next, the controller 120 determines a vocalized position area of the human screen image 50 based on the vocalized position information included in the obtained image information.

As illustrated in FIG. 2, the controller 120 may determine the face image area 50' of the human screen image 50 as the vocalized position area based on the vocalized position information included in the preobtained image information. When the vocalized position area is determined, the controller 120 may measure the distance from a first to fourth speakers 10 to 40 dispersedly disposed in the edge areas of the display apparatus based on the coordinates (x, y) of the face image area 50' (which is the determined vocalized position area).

When the distance from the first to fourth speakers 10 to 40 dispersedly disposed in the edge areas of the display apparatus is measured based on the coordinates (x, y) of the face image area 50', the audio processor 140 signal-processes the audio signal corresponding to the video frame displayed on the screen differently based on each of the measured distance from the first to fourth speakers 10 to 40.

As illustrated in FIG. 2, it may be measured that of the first to fourth speakers 10 to 40, the distance A between the coordinates (x, y) of the face image area 50' and the second speaker 20 is the shortest, whereas the distance B between the coordinates (x, y) of the face image area 50' and the fourth speaker 40 is the second shortest. In addition, it may be measured that the distance C between the coordinates (x, y) of the face image area 50' and the first speaker 10 is the third shortest, whereas the distance D between the coordinates (x, y) of the face image area 50' and the third speaker 30 is the longest.

When the distances from the coordinates (x, y) of the face image area 50' and the first to fourth speakers 10 to 40 are measured, the audio processor 140 may create an audio output signal of the second speaker 20 so that the audio output through the second speaker 20 is the loudest, and create an audio output signal of the fourth speaker 40 so that the audio output through the fourth speaker 40 is the second loudest. Furthermore, the audio processor 140 may create an audio output signal of the first speaker 10 so that the audio output through the first speaker 10 is the third loudest, and create an audio output signal of the third speaker 30 so that the audio output through the third speaker 30 is the quietest.

According to such audio output signals, of the first to fourth speakers 10 to 40, the second speaker 20 may output the loudest audio relative to the other speakers 10, 30, and 40. Therefore, the display apparatus according to the present disclosure may provide a stereophonic sound service having an effect as if audio is output at display points of the image displayed on the screen.

According to additional aspect of the present disclosure, when the vocalized position moves within the video frame, the controller 120 may control the audio processor 140 to individually change the audio output signals provided to the plurality of speakers 170 according to the moved vocalized position. In particular, the controller 120 may compare the plurality of video frames being input sequentially to detect a moved area, and determine the detected moved area as the vocalized position. When it is determined that the vocalized position moved based on the moved area detection, the controller 120 controls the audio processor 140 to individually change the audio output signals provided to the plurality of speakers 170 according to the moved vocalized position.

Figure 3:
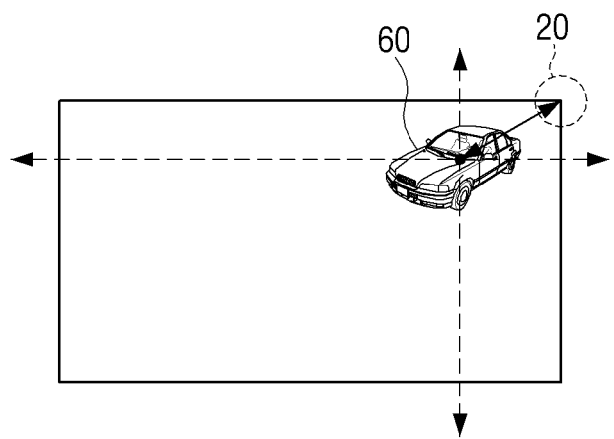
FIG. 3 is an exemplary view of an audio output signal being individually changed according to a movement of a screen image in a display apparatus according to an exemplary embodiment.
Figure 3:
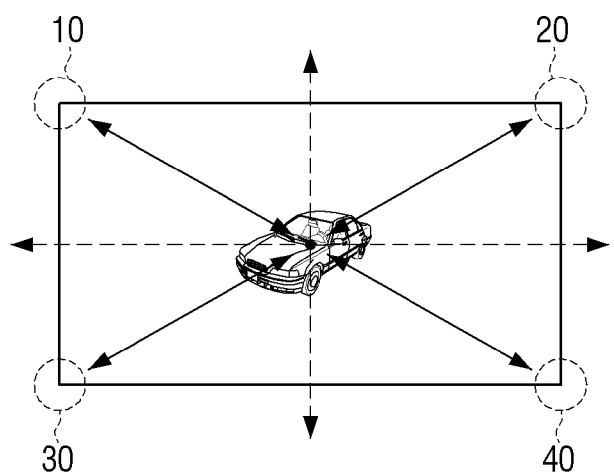
Figure 3:
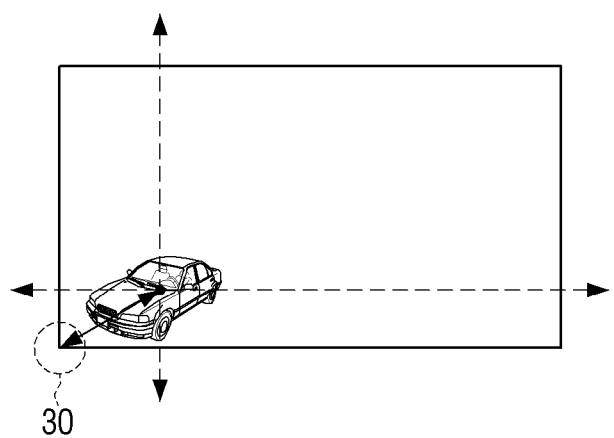

FIG. 3 is an exemplary view of changing the audio output signal according to the movement of the screen image in the display apparatus according to an exemplary embodiment.

As illustrated in (a) of FIG. 3, the controller 120 may detect an automobile screen image 60 within a first video frame displayed on the screen through the displayer 160. When such an automobile screen image 60 is detected, the controller 120 obtains image information related to the predetected automobile screen image 60 of the prestored image information. Next, the controller 120 determines the vocalized position area of the automobile screen image based on the vocalized position information included in the obtained image information.

As illustrated in (a) of FIG. 3, the controller 120 measures the distances from the first to fourth speakers 10 to 40 dispersedly disposed in the edge areas of the display apparatus based on the coordinates (x, y) of the vocalized position corresponding to the vocalized position area of the automobile screen image 60, based on the vocalized position information included in the preobtained image information. As illustrated in (a) of FIG. 3, it may be measured that the distance between the coordinates (x, y) corresponding to the vocalized position of the automobile screen image 60 and the second speaker 20 is the shortest.

When the distances between the coordinates (x, y) corresponding to the vocalized position of the automobile screen image 60 and the first to fourth speakers 10 to 40 are measured, the audio processor 140 signal-processes a first audio signal corresponding to the first video frame being displayed on the screen based on each of the measured distance from the first to fourth speakers 10 to 40.

In other words, the audio processor 140 may create the audio output signals being output to the first to fourth speakers 10 to 40 differently according to the extent of the distance between the coordinates (x, y) corresponding to the vocalized position of the automobile screen image 60 and the first to fourth speakers 10 to 40, and may provide the each created audio output signal to each of the first to fourth speakers 10 to 40. Therefore, the first to fourth speakers 10 to 40 may output audio of different audio volumes based on the audio output signals provided from the audio processor 140. Of the first to fourth speakers 10 to 40, the second speaker 20 may output relatively loud audio compared to the other speakers 10, 30, and 40.

Meanwhile, when a second video frame is input after the first video frame is input, the controller 120 compares the first and second video frames and detects a moved area. In particular, when the second video is input, the controller 120 detects a screen image within the second video frame input. Next, the controller 120 analyzes the screen image detected within the second video frame, and determines whether or not the corresponding screen image is the same screen image as the screen image detected within the first video frame.

If it is determined that the corresponding screen image is the same screen image as the automobile screen image detected within the first video frame, the controller 120 compares the first and second video frames and detects a moved area of the automobile screen image 60. As illustrated in (b) of FIG. 3, it may be detected that the automobile screen image 60 is moved from the central area to the upper right end. When such a moved area is detected, the controller 120 measures the distance between the first to fourth speakers 10 to 40 dispersedly disposed in the edge areas of the display apparatus and the coordinates (x', y') corresponding to the vocalized position of the automobile screen image 60 where the central area is located.

As illustrated in (b) of FIG. 3, when the automobile screen image 160 is located in the central area of the screen, each distance between the coordinates (x', y') and the first to fourth speakers 10 to 40 may all be located within the predetermined critical range. As such, when it is measured that each distance between the coordinates (x', y') and the first to fourth speakers 10 to 40 are all located within the predetermined critical range, the audio processor 140 signal-processes the second audio signal corresponding to the second video frame displayed on the screen to be output as audio having a same audio volume. Therefore, the first to fourth speakers 10 to 40 may output audio of the same audio volume.

When a third video frame is input after the second video frame is input, the controller 120 compares the second and third video frames and detects a moved area. The controller 120 detects a screen image in the third video frame input, and compares the detected screen image to determine whether or not the corresponding screen image is the same screen image as the screen image detected within the second video frame.

If it is determined that the corresponding screen image is the same screen image as the automobile screen image detected within the second video frame, the controller 120 compares the second and third video frames and detects a moved area of the automobile screen image 60. As illustrated in (c) of FIG. 3, it may be detected that the automobile screen image 60 is moved from the central area to the lower left. When such a moved area is detected, the controller 120 measures the distance between the first to fourth speakers 10 to 40 dispersedly disposed in the edge areas of the display apparatus and the coordinates (x", y") corresponding to the vocalized position of the automobile screen image 60 located in the lower left.

If the automobile screen image 60 is located in the lower left of the screen, it may be measured that the distance between the coordinates (x", y") and the third speaker 30 is the shortest. When the distances between the coordinates (x", y") corresponding to the vocalized position of the automobile screen image 60 and the first to fourth speakers 10 to 40 are measured, the audio processor 140 signal-processes the third audio signal corresponding to the third video frame being displayed on the screen based on each of the distances between the coordinates (x", y") and the first to fourth speakers 10 to 40.

The audio processor 140 creates different audio output signals to be output to the first to fourth speakers 10 to 40 such that the audio output of the third speaker 30 that has the shortest distance from the coordinates (x", y") corresponding to the vocalized position of the automobile screen image 60 is relatively louder than the audio output of other speakers 10, 20, and 40.

Meanwhile, according to another aspect of the present disclosure, the controller 120 compares the video frames and determines the vocalizer of the audio signals. Next, the controller 120 controls the audio processor 140 to divide an audio signal corresponding to a video frame into a plurality of sub audio signals based on an audio characteristic corresponding to the determined vocalize.

According to such a control command, the audio processor 140 divides the audio signal corresponding to the video frame into a plurality of sub audio signals. Next, the audio processor 140 may adjust and re-combine the plurality of sub audio signals based on the distances between the predetected vocalized location and the plurality of speakers 170 and create a plurality of audio output signals.

Figure 4:
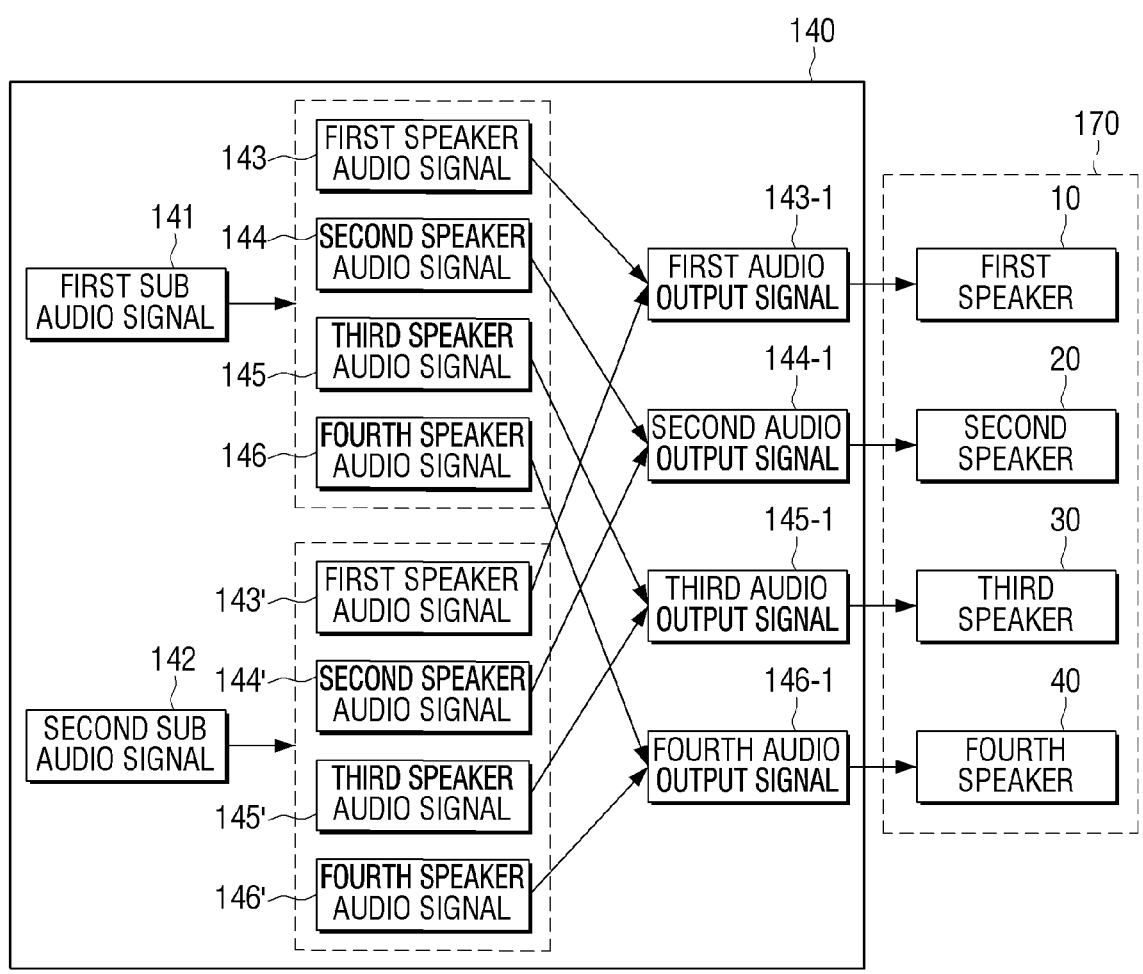
FIG. 4 is a block diagram of a plurality of audio signals being divided and re-combined in an audio processor according to an exemplary embodiment.

FIG. 4 is a block diagram of a plurality of audio signals being divided and re-combined in an audio processor according to an exemplary embodiment.

As illustrated in FIG. 4, when an audio signal including received contents is input, the audio processor 140 analyzes the input audio signal and determines whether or not there is an audio signal having a different frequency band. When it is determined that there is an audio signal having a different frequency band, the audio processor 140 divides the audio signal input into a first sub audio signal 141 having a first frequency band and a second sub audio signal 142 having a second frequency band. Detailed explanation of dividing an audio signal having a plurality of frequency into different audio signals is well known and therefore is omitted.

When the input audio signal is divided into a first and second sub audio signal 141, 142, the audio processor 140 creates a speaker audio signal per each of the first and second sub audio signals 141, 142 based on the distances between the predetected vocalized position and the first to fourth speakers 10 to 40.

In particular, the audio processor 140 creates a first to fourth speaker audio signals 142 to 146 based on the distances between the vocalized position of the first screen image matching the first sub audio signal and the first to fourth speakers 10 to 40. Herein, each of the first to fourth speaker audio signals 143 to 146 is an audio output signal to be output from the first to fourth speakers 10 to 40.

Meanwhile, the audio processor 140 creates a first to fourth speaker audio signals 143' to 146' based on a distance between the vocalized position of the second screen image matching the second sub audio signal and the first to fourth speakers 10 to 40. Herein, each of the first to fourth speaker audio signals 143' to 146' is an audio output signal to be output from the first to fourth speakers 10 to 40.

Therefore, when a speaker audio signal for each of the first to fourth sub audio signals 141, 142 is created, the audio processor 140 combines each speaker audio signal to be output from the first to fourth speakers 10 to 40. As illustrated, the audio processor 140 combines the first speaker audio signals 143, 143' created from the first and second sub audio signals 141, 142 and creates a first audio output signal 143-1, and combines the second speaker audio signals 144, 144' created from the first and second sub audio signals 141, 142 and creates a second audio output signal 144-1. In addition, the audio processor 140 combines the third speaker audio signals 145, 145' created from the first and second sub audio signals 141, 142 and creates a third audio output signal 145-1, and combines the fourth speaker audio signals 146, 146' created from the first and second sub audio signals 141, 142 and creates a fourth audio output signal 146-1.

When each of the first to fourth audio output signals 143-1 to 146-1 is created, the audio processor 140 provides each of the first to fourth audio output signals 143-1 to 146-1 to the first to fourth speakers 10 to 40. Therefore, the first to fourth speakers 10 to 40 may output audio of different audio volumes based on the first to fourth audio output signals 143-1 to 146-1.

Below is a detailed explanation on an operation of providing a stereophonic sound service so that audio of each screen image is output from the corresponding screen image according to the display location of the plurality of screen images in the display apparatus.

Figure 5:
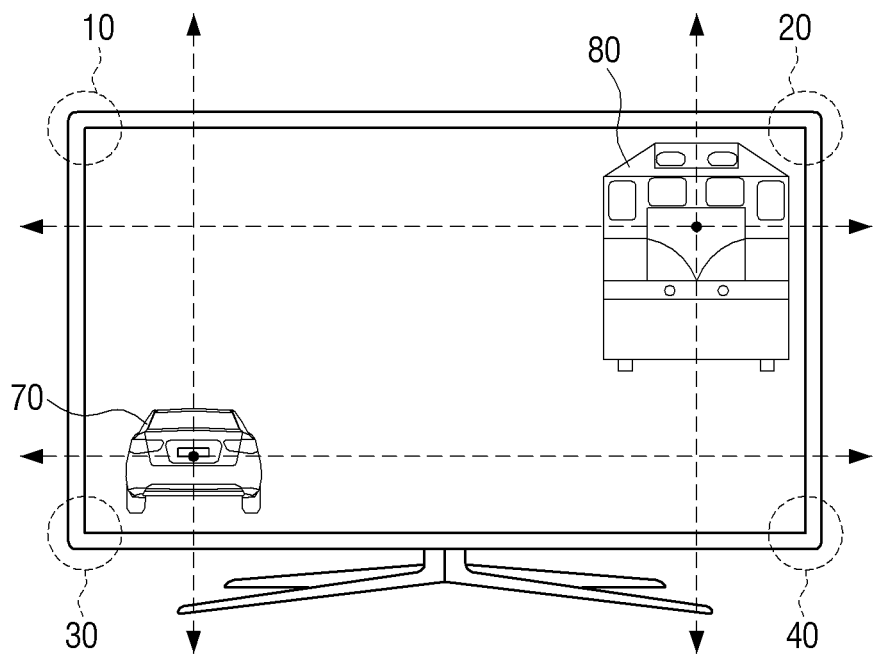
FIG. 5 is an exemplary view of a stereophonic sound service where audio of each screen image is output in each display area of each of a plurality of screen images being displayed in a display apparatus according to an exemplary embodiment.

FIG. 5 is an exemplary view of a stereophonic sound service where audio of each screen image is output in each display area of each of a plurality of screen images being displayed in a display apparatus according to an exemplary embodiment.

As illustrated in FIG. 5, the controller 120 detects a screen image within the video frame being displayed on the screen through the displayer 160. As illustrated, when an automatic screen image 70 and a train screen image 80 are detected, the controller 120 obtains image information related to the predetected automobile 70 and predetected train screen image 80 of the image information prestored in the storage unit 150. Next, the controller 120 determines the vocalized position area of the automobile 70 and train screen image 80 based on the vocalized position information included in each of the image information obtained.

When the vocalized position area of the automobile 70 and train screen image 80 is determined, the controller 120 measures the distance between the first coordinates (x, y) regarding the vocalized position area of the automobile screen image 70 and the first to fourth speakers 10 to 40 dispersedly disposed in the edge areas of the display apparatus. In addition, the controller 120 measures the distance between the second coordinates (x', y') regarding the vocalized position area of the train screen image 80 and the first to fourth speakers 10 to 40 dispersedly disposed in the edge areas of the display apparatus.

When the distance between the second coordinates of the automobile 70 and train screen image 80 and the first to fourth speakers 10 to 40 dispersedly disposed in the edge areas of the display apparatus, the audio processor 140 signal-processes the audio signal corresponding to the video frame being displayed on the screen differently based on each measured distance from the first to fourth speakers 10 to 40.

In particular, the audio processor 140 analyzes the input audio signal and determines whether or not there is an audio signal having a different frequency band. When it is determined that there is an audio signal having a different frequency band, as explained in FIG. 4, the audio processor 140 divides the audio signal into a first sub audio signal 141 having a first frequency band and a second sub audio signal 142 having a second frequency band. When the audio signal is divided into the first and second sub audio signal 141, 142, the audio processor 140 obtains image information corresponding to each of the first and second sub audio signals 141, 142 with reference to the frequency band information included in the image information stored in the storage unit 150.

The first sub audio signal 141 may be an audio signal regarding automobile sound, and the second sub audio signal 142 may be an audio signal regarding train sound. Therefore, the controller 120 may match the first and second coordinates of the predetected automobile 70 and the predetected train screen image 80 to the first and second sub audio signal 141, 142.

The controller 120 may match the first sub audio signal 141 to the first coordinates of the automobile screen image 70 based on each image information obtained through the audio processor 140, and match the second sub audio signal 142 to the second coordinates of the train screen image 80.

Therefore, when the first and second coordinates match each of the first and second sub audio signal 141, 142, the audio processor 140 creates a plurality of audio signals regarding the first and second sub audio signal 141, 142 based on the distance between each coordinates and the first to fourth speakers 10 to 40.

In particular, the audio processor 140 may create a first to four speaker audio signals 143 to 146 corresponding to each of the first to fourth speakers 10 to 40 based on the distance between the first coordinates matching the first sub audio signal 141 and the first to fourth speakers 10 to 40. In other words, the audio processor 140 may create a third speaker audio signal 145 corresponding to the third speaker 30 so that audio regarding the loudest automobile sound is output from the third speaker 30 that is the most adjacent to the first coordinates, and may create a second speaker audio signal 144 corresponding to the second speaker 20 so that audio regarding the smallest automobile sound is output from the second speaker 20 that is the farthest from the first coordinates.

In addition, the audio processor 140 may create a first to fourth speaker audio signals 143' to 146' corresponding to each of the first to fourth speakers 10 to 40 based on the distance between the second coordinates matching the second sub audio signal 142 and the first to fourth speakers 10 to 40. In other words, the audio processor 140 may create a second speaker audio signal 144' corresponding to the second speaker 20 so that audio regarding the loudest train sound can be output from the second speaker 20 which is most adjacent to the second coordinates, and may create a third speaker audio signal 145' corresponding to the third speaker 30 so that audio regarding the smallest train sound can be output from the third speaker 30 which is the farthest from the second coordinates.

When the plurality of speaker audio signals regarding each of the first and second sub audio signals 141, 142 are created, the audio processor 140 combines each speaker audio signal to be output from the first to fourth speakers 10 to 40. In other words, the audio processor 140 combines the first speaker audio signals 143, 143' created from the first and second sub audio signals 141, 142 to create the first audio output signal 143-1, and combines the second speaker audio signals 144, 144' to create the second audio output signal 144-1. In additional, the audio processor 140 combines the first speaker audio signals 145, 145' created from the first and second audio signals 141, 142 to create the third audio output signal 145-1, and combines the fourth speaker audio signals 146, 146' to create the fourth audio output signal 146-1.

When each of the first to fourth audio output signals 143-1 to 146-1 is created, the audio processor 140 provides each of the first to fourth audio output signals 143-1 to 146-1 to the first to fourth speakers 10 to 40. Accordingly, the first to fourth speakers 10 to 40 may output audio of different audio volumes based on the first to fourth audio output signals.

As illustrated in FIG. 5, the second speaker 20 may output the audio for train sound the loudest and output the audio for automobile sound the quietest, according to the second audio output signal 144-1 provided from the audio processor 140. In addition, the third speaker 30 may output the audio for automobile sound the loudest and output the audio for train sound the quietest, according to the third audio output signal 145-1 provided from the audio processor 140.

The speaker 170 may be disposed in each edge portion or central portion of each side of the main body of the display apparatus. Such a speaker 170 may be a general speaker, or a vibration speaker configured to control the vibration of a plurality of vibration elements to vibrate a solid plane and generate sound waves. In the case where the speaker 170 is a vibration speaker, in an exemplary embodiment, a plurality of vibration elements that vibrate a solid plane may be disposed in each edge of the rear side of the display panel or in a central portion of each side.

In another exemplary embodiment, a plurality of vibration elements that vibrate a solid plane may be disposed in the rear side of the display panel with a certain distance from one another.

Figure 6:
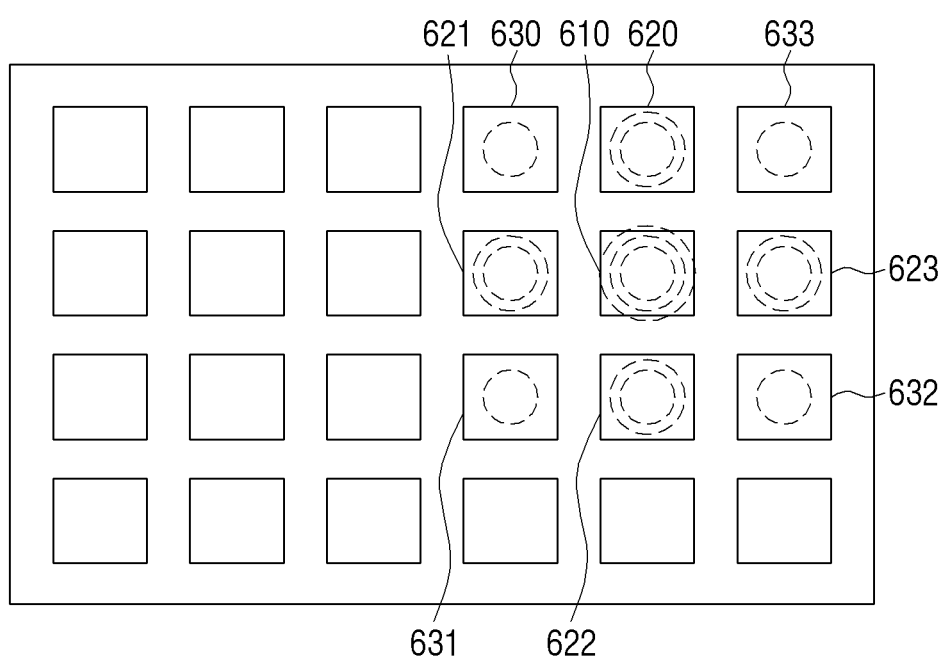
FIG. 6 is an exemplary view of disposing a vibration element of a vibration speaker in a rear surface of a panel of a display apparatus according to an exemplary embodiment.

FIG. 6 is an exemplary view of disposing a vibration element of a vibration speaker in a rear side of a display apparatus panel according to an exemplary embodiment.

As illustrated in FIG. 6, M*N vibration elements may be disposed with a certain distance from one another in the rear side of the display panel of the display apparatus. In the plurality of vibration elements disposed in the rear side of the display panel, at least one vibration element generates vibration based on the audio output signal provided through the audio outputter 140.

As in FIG. 2, when a vocalized position is detected from the human screen image 50 detected within the video frame, the audio processor 140 may create a different audio output signal per each of the plurality of vibration elements based on the predetected vocalized position and the location information per each vibration element prestored in the storage unit 150.

As illustrated in FIG. 6, the vibration element disposed at the point most adjacent to the vocalized position detected from the human screen image 50 may be a first vibration element 610. In this case, the audio processor 140 may create an audio output signal so that a greatest vibration may be generated from the first vibration element 610 of the plurality of vibration elements, create an audio output signal so that a vibration smaller than the first vibration element 610 may be generated from the first to fourth vibration elements 620 to 623 disposed up, down, left, and to the right side of the first vibration element 610, and create an audio output signal so that a smallest vibration may be generated from the fifth to eighth vibration elements 630 to 633 disposed diagonally to the first vibration element 610. Accordingly, the first vibration element 610, the second to fourth vibration elements 620 to 623, and the fifth to eighth vibration elements 630 to 633 may generate vibration of different vibration strengths. Therefore, the user may be provided with a stereophonic sound service having an effect as if audio is output from the point where the screen being displayed on the screen of the display apparatus is located.

Operations for providing a stereophonic sound service in a display apparatus according to various exemplary embodiments were explained above. Below is a detailed explanation of a method for providing a stereophonic sound service in a display apparatus according to the exemplary embodiments.

Figure 7:
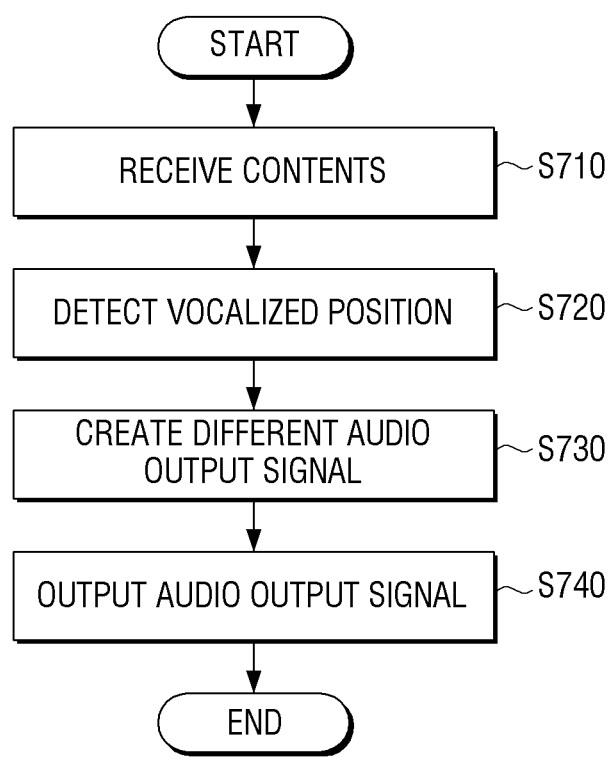
FIG. 7 is a first flowchart of a method for providing a stereophonic sound service in a display apparatus according to an exemplary embodiment.

FIG. 7 is a first flowchart of a method for providing a stereophonic sound service in a display apparatus according to an exemplary embodiment.

As illustrated in FIG. 7, the display apparatus receives contents consisting of a video frame and audio signals from the contents server (not illustrated) (S710). When contents are received, the display apparatus detects a vocalized position within the video frame to be displayed (S720). When the vocalized position is detected, the display apparatus processes the audio signal corresponding to the video frame differently according to the predetected vocalized position and the distance between the plurality of speakers to create a plurality of audio output signals (S730). Next, the display apparatus provides the audio output signal corresponding to each speaker to each of the plurality of speakers to create audio of different audio volumes (S740).

Therefore, the user may be provided with a stereophonic sound service having the effect as if audio is being output from the point where the image being displayed on the screen of the display apparatus is located.

The plurality of speakers which output audio of different audio volumes based on the audio output signal may be dispersed in the main body of the display apparatus. Further, the plurality of speakers may be disposed, in each edge or central portion of each side of the display apparatus. Such a speaker may be a general speaker or a vibration speaker configured to control the vibration of a plurality of vibration elements to vibrate a solid plane, and generate sound waves. When the speaker is a vibration speaker, according to an exemplary embodiment, the plurality of vibration elements which vibrate a solid plane may be disposed in each edge of the rear side or central portion of each side of the display apparatus.

According to another exemplary embodiment, the plurality of vibration elements that vibrate the solid plane may be disposed in the rear side of the display panel within a certain distance from one another.

At step S730, the display apparatus analyzes the video frame and determines the vocalizer of the audio signal. Next, the display apparatus divides the audio signal corresponding to the video frame into a plurality of sub audio signals based on the audio characteristic corresponding to the determined vocalization. Next, the display apparatus adjusts and recombines the plurality of divided sub audio signals based on the predetected vocalized position and the distance between the plurality of speakers to create a plurality of audio output signals.

According to an exemplary embodiment, the display apparatus analyzes the audio signal included in the contents and determines whether or not there is an audio signal having a different frequency band. When it is determined that there is an audio signal having a different frequency band, the display apparatus may divide the input audio signal into a first and second sub audio signals.

Next, the display apparatus creates a first to fourth speaker audio signals based on the distance between the vocalized position of the first screen image (first vocalize) matching the first sub audio signal divided from the audio signal and the first to fourth speakers. The first to fourth speaker audio signals are audio output signals per each speaker for the first sub audio signal.

In addition, the display apparatus creates the first to fourth speaker audio signals based on the distance between the vocalized position of the second screen image (the second vocalization) matching the second sub audio signal divided from the audio signal and the first to fourth speakers. The first to fourth speaker audio signals are audio output signals per each speaker for the second sub audio signal.

As such, when a speaker audio signal per each of the first and second sub audio signals is created, the display apparatus may combine each speaker audio signal to be output to each speaker and create a final audio output signal to be output from each speaker.

Figure 8:
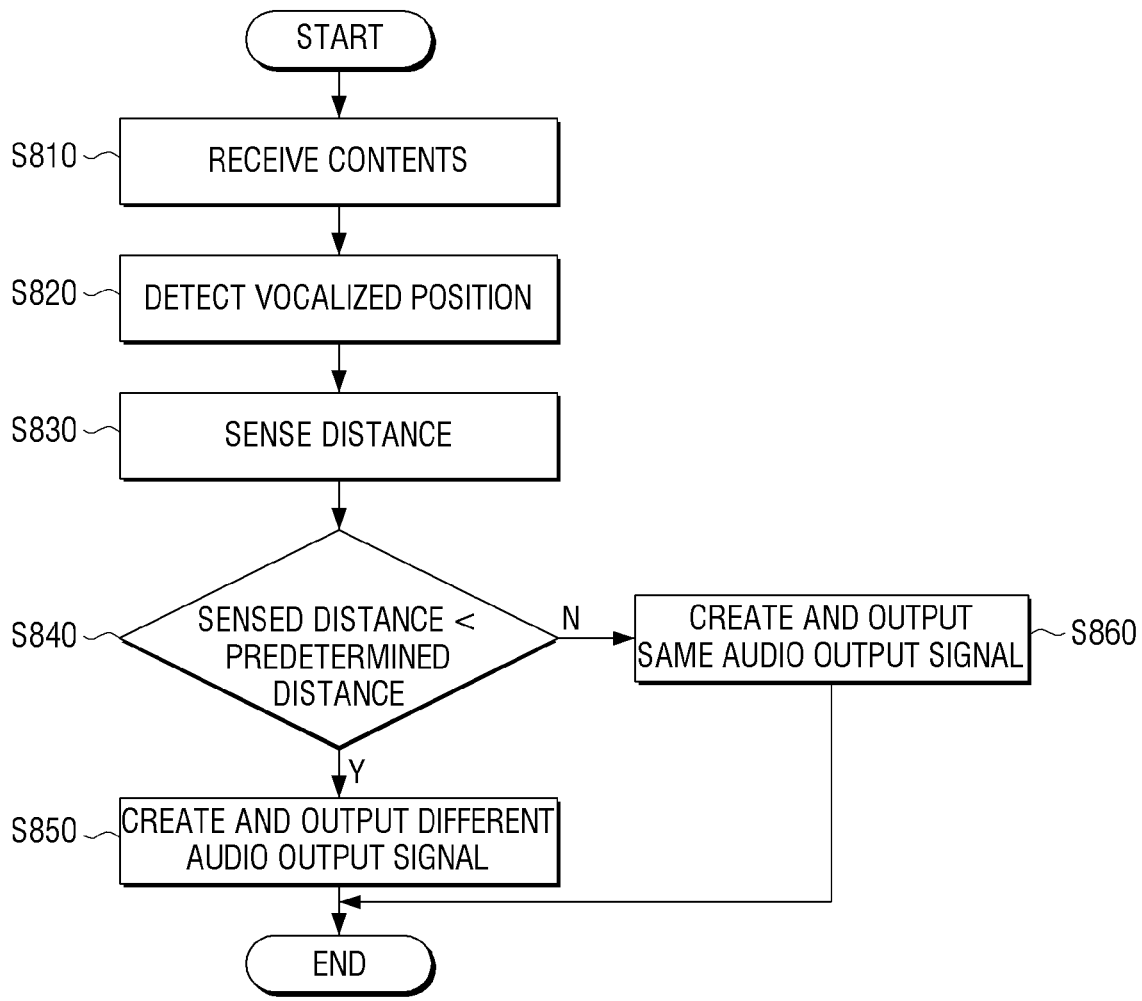
FIG. 8 is a second flowchart of a method for providing a stereophonic sound service in a display apparatus according to another exemplary embodiment.

FIG. 8 is a second flowchart of a method for providing a stereophonic sound service in the display apparatus according to another exemplary embodiment.

When contents are received from the contents server (not illustrated) based on the method as in step S710 and step S720 of FIG. 7, the display apparatus detects the vocalized position within the video frame included in the received contents (S810, S820). Next, when the distance between the display apparatus and the viewer is sensed through the sensor, the display apparatus determines whether or not the sensed distance is within the predetermined distance (S830, S840). If it is determined that the distance between the display apparatus and the viewer is within the predetermined distance, the display apparatus creates a different audio output signal according to the distance between the predetected vocalized position and the plurality of speakers. Next, the display apparatus provides the audio output signal corresponding to each of the plurality of speakers to the plurality of speakers and outputs audio of different audio volumes through the plurality of speakers (S850).

When it is determined that the distance between the display apparatus and the viewer exceeds the predetermined distance, the display apparatus creates a same audio output signal, and provides each audio output signal created to each speaker to output the same audio through each speaker (S860).

The display apparatus according to the present disclosure may provide a stereophonic sound service having an effect as if audio is output at the point where the image being displayed on the screen of the display apparatus is located, or a general sound service.

Below is a detailed explanation on the method for providing a stereophonic sound service for a moved image in a display apparatus according to the present disclosure.

Figure 9:
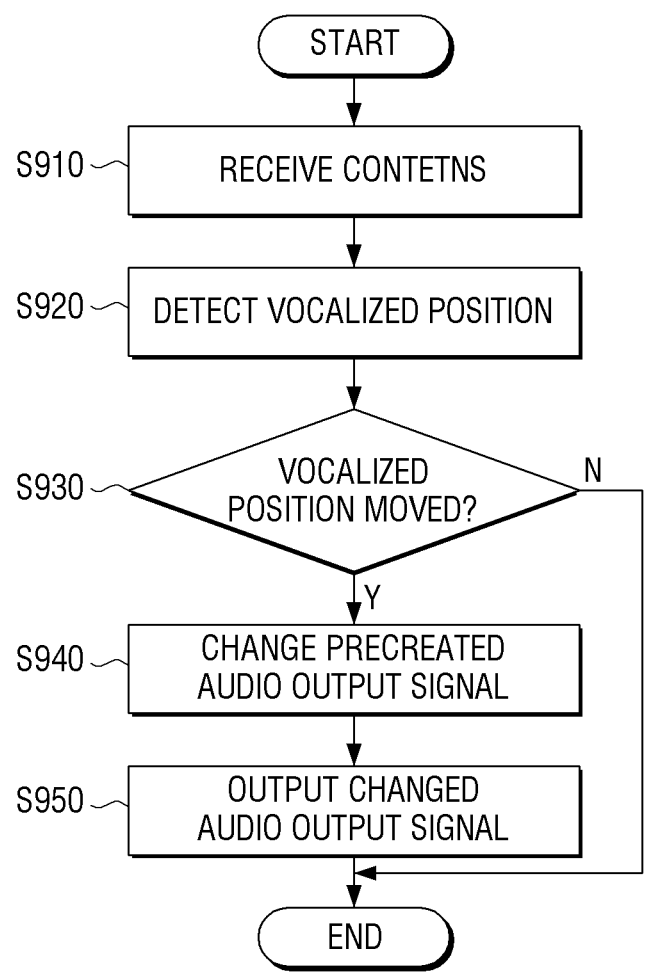
FIG. 9 is a flowchart of a method for providing a stereophonic sound service for a movement image in a display apparatus according to an exemplary embodiment.

FIG. 9 is a flowchart of a method for providing a stereophonic sound service regarding a moved image in a display apparatus according to an exemplary embodiment.

After the audio output signals are created and output such that different audio is output per each of the plurality of speakers at step S740, when a video frame of the corresponding contents is sequentially input, the display apparatus compares the previous video frame with the current video frame to detect the moved area, and determines the detected moved area as the vocalized position.

In particular, when a video frame of the contents is sequentially input, the display apparatus detects the vocalized position of the screen image within the currently input video frame (S910, S920). Next, the display apparatus determines whether or not the screen image detected in the previous video frame is the same screen image as the one detected in the currently input video frame. When it is determined that the screen image detected in the previous video frame is the same screen image as the one detected in the currently input video frame, the display apparatus compares the display area of the screen image of the previous video frame with the display area of the screen image of the current video frame to determine whether or not the corresponding screen image has moved.

When it is determined that the screen image has moved, the display apparatus determines that the vocalized position has moved corresponding to the moved screen image (S930). According to the moved vocalized position, the display apparatus individually changes the audio output signal signal-processed differently per each speaker at step S740. Next, the display apparatus provides the audio output signal individually changed in response to each of the speakers to output audio of the changed audio volume through the plurality of speakers (S950).

A program for performing a method according the aforementioned exemplary embodiments may be stored in various types of record media and be used.

In particular, a code for performing the aforementioned methods may be stored in various types of record media that may be read in a terminal, such as a RAM (Random Access Memory), Flash memory, ROM (Read Only Memory), EPROM (Erasable Programmable ROM), EEPROM (Electronically Erasable and Programmable ROM), Register, hard disc, removable disc, memory card, USB memory, CD-ROM.

Although a few embodiments have been shown and described, it would be appreciated by those skilled in the art that changes may be made in this embodiment without departing from the principles and spirit, the scope of which is defined in the claims and their equivalents.

What is claimed is:

1. A display apparatus comprising:
   a controller configured to detect a vocalized position in a video frame in a display; and
   an audio processor configured to process an audio signal corresponding to the video frame differently according to a distance between the vocalized position and each of a plurality of speakers, create a plurality of audio output signals, and provide each created audio output signal to each of the plurality of speakers,
   wherein the controller controls the audio processor to change the each created audio output signal provided to the each of the plurality of speakers according to a moved vocalized position in response to the vocalized position being moved within the video frame,
   wherein when an audio signal corresponding to the video frame includes sub audio signals with frequency bands different from each other, the audio processor adjusts and recombines the audio signal according to a distance between the vocalized position of a speech object which corresponds to each of the sub audio signals and each of the plurality of speakers, and creates the plurality of audio output signals.

2. The display apparatus according to claim 1,
   wherein the controller analyzes the video frame to determine a vocalizer of the audio signal, and controls the audio processor to divide the audio signal into a plurality of sub audio signals based on an audio characteristic corresponding to the vocalizer.

3. The display apparatus according to claim 1,
   wherein the controller compares a plurality of video frames being sequentially input to detect a moved area, and determines that the detected moved area is the moved vocalized position.

4. The display apparatus according to claim 1, further comprising:
   a contents receiver configured to receive contents comprising the video frame and the audio signal,
   wherein the controller detects the vocalized position per each video frame based on additional data recorded in a header portion of the contents.

5. The display apparatus according to claim 1, further comprising:
   a sensor configured to sense a distance from a viewer,
   wherein the controller detects the vocalized position and controls the audio processor to create a different audio output signal according to the vocalized position if the distance from the viewer is within a predetermined distance, and creates a same audio output signal if the distance from the viewer exceeds the predetermined distance.

6. The display apparatus according to claim 1,
   wherein the plurality of speakers are disposed in each edge or in a central portion of each side of the main body of the display apparatus.

7. The display apparatus according to claim 1,
   wherein the plurality of speakers are vibration speakers disposed in a rear surface of the display.

8. The display apparatus according to claim 1, wherein the display is configured to display the video frame.

9. The display apparatus according to claim 1, wherein the plurality of speakers are disposed in a main body of the display apparatus.

10. A method for providing a stereophonic sound service of a display apparatus, the method comprising:
    detecting a vocalized position within a video frame to be displayed;
    processing an audio signal corresponding to the video frame differently according to a distance between the vocalized position and each of the plurality of speakers, and creating a plurality of audio output signals;
    outputting the plurality of audio output signals using a plurality of speakers disposed in a main body of the display apparatus; and
    changing each of the audio output signals provided to the each of the plurality of speakers according to a moved vocalized position in response to the vocalized position being moved within the video frame,
    wherein when an audio signal corresponding to the video frame includes sub audio signals with frequency bands different from each other, the creating the plurality of audio output signals comprises adjusting and re-combining the audio signal according to a distance between the vocalized position of a speech object which corresponds to each of the sub audio signals and each of the plurality of speakers, and creating the plurality of audio output signals.

11. The method according to claim 10,
    wherein the creating the plurality of audio output signals comprises dividing the audio signal corresponding to the video frame into the plurality of sub audio signals.

12. The method according to claim 10,
    wherein the creating the plurality of audio output signals comprises analyzing the video frame to determine a vocalizer of the audio signal, and dividing the audio signal into a plurality of sub audio signals based on an audio characteristic corresponding to the vocalizer.

13. The method according to claim 10,
    the changing each of the output signals comprises comparing a plurality of video frames being sequentially input to detect a moved area, and determining that the detected moved area is the moved vocalized position.

14. The method according to claim 10, further comprising:
    receiving contents comprising the video frame and the audio signal,
    wherein the detecting involves detecting the vocalized position per each video frame based on additional data recorded in a header portion of the contents.

15. The method according to claim 10, further comprising:
    sensing a distance from a viewer,
    wherein the creating the plurality of audio output signals comprises detecting the vocalized position, and controlling the audio processor to create a different audio output signal according to the vocalized position if the distance from the viewer is within a predetermined distance, and creating a same audio output signal if the distance from the viewer exceeds the predetermined distance.

16. The method according to claim 10, wherein the plurality of speakers are disposed in each edge or in a central portion of each side of the main body of the display apparatus.

17. The method according to claim 10, wherein the plurality of speakers are vibration speakers disposed in a rear surface of a displayer.

18. A method for providing a stereophonic sound service of a display apparatus, the method comprising:
   receiving contents comprising at least one video frame and at least one audio signal;
   detecting a vocalized position within the at least one video frame of the contents;
   measuring a plurality of distances between the vocalized position and a plurality of speakers;
   creating a plurality of audio output signals based on the corresponding plurality of distances between the vocalized position and the plurality of speakers; and
   outputting the plurality of audio output signals through the corresponding speakers,
   wherein when an audio signal corresponding to the video frame includes sub audio signals with frequency bands different from each other, the creating the plurality of audio output signals comprises adjusting and re-combining the audio signal according to a distance between the vocalized position of a speech object which corresponds to each of the sub audio signals and each of the plurality of speakers, and creating the plurality of audio output signals.

19. The method of claim 18, wherein an audio volume of each of the plurality of audio output signals is inversely proportional to a corresponding distance between the vocalized position and each of the speakers.

20. The method of claim 19, wherein the audio volume of a first audio output signal is lower than remaining audio output signals when the first audio output signal corresponds to a longest distance of the distances.

21. The method of claim 19, wherein the audio volume of a second audio output signal is higher than remaining audio output signals when the second audio output signal corresponds to a shortest distance of the distances.

* * * * *